US005985526A

United States Patent [19]

Tutt et al.

[11] Patent Number: 5,985,526

[45] Date of Patent: Nov. 16, 1999

[54] IMAGING PROCESS BASED ON CHANGE OF OPTICAL COVERING POWER

[75] Inventors: Lee W. Tutt, Webster; Ian R. Gould, Pittsford; Mitchell S. Burberry, Webster; Samir Y. Farid, Rochester, all of N.Y.

[73] Assignee: Eastman Kodak Company, Rochester, N.Y.

[21] Appl. No.: 09/100,215

[22] Filed: Jun. 19, 1998

[51] Int. Cl.[6] .............................. G01D 15/10; G03C 5/16; G03C 5/56

[52] U.S. Cl. .......................... 430/332; 430/138; 430/338; 430/346; 430/348; 430/964; 346/76.1

[58] Field of Search .................................... 430/964, 138, 430/332, 338, 346, 348; 346/76.1

[56] References Cited

U.S. PATENT DOCUMENTS

| | | | |
|---|---|---|---|
| 3,322,557 | 5/1967 | Schwab | 117/36.2 |
| 3,539,375 | 11/1970 | Baum | 430/964 |
| 4,621,040 | 11/1986 | Viola | 430/138 |
| 5,427,886 | 6/1995 | Miller et al. | 430/964 |

*Primary Examiner*—Richard L. Schilling
*Attorney, Agent, or Firm*—Harold E. Cole

[57] ABSTRACT

A method of forming an image comprising imagewise-exposing a thermal recording element to heat, the element comprising a support having thereon a thermally-sensitive layer comprising particles containing a colorant, the particles having a particle size between about 1 and about 25 μm suspended in a matrix, the layer having an optical density no higher than about 0.5, the heating thereby causing the colorant to spread out from the particles into the matrix, thus increasing the optical density in the imagewise-exposed areas.

16 Claims, No Drawings

IMAGING PROCESS BASED ON CHANGE OF OPTICAL COVERING POWER

FIELD OF THE INVENTION

This invention relates to a method of forming an image using a layer which undergoes a change in optical covering power upon heating.

BACKGROUND OF THE INVENTION

In recent years, thermal transfer systems have been developed to obtain prints from pictures which have been generated electronically from a color video camera. According to one way of obtaining such prints, an electronic picture is first subjected to color separation by color filters. The respective color-separated images are then converted into electrical signals. These signals are then operated on to produce cyan, magenta and yellow electrical signals. These signals are then transmitted to a thermal printer. To obtain the print, a cyan, magenta or yellow dye-donor element is placed face-to-face with a dye-receiving element. The two are then inserted between a thermal printing head and a platen roller. A line-type thermal printing head is used to apply heat from the back of the dye-donor sheet. The thermal printing head has many heating elements and is heated up sequentially in response to one of the cyan, magenta or yellow signals. The process is then repeated for the other two colors. A color hard copy is thus obtained which corresponds to the original picture viewed on a screen. Further details of this process and an apparatus for carrying it out are contained in U.S. Pat. No. 4,621,271, the disclosure of which is hereby incorporated by reference.

Another way to thermally obtain a print using the electronic signals described above is to use a laser instead of a thermal printing head. In such a system, the donor sheet includes a material which strongly absorbs at the wavelength of the laser. When the donor is irradiated, this absorbing material converts light energy to thermal energy and transfers the heat to the dye in the immediate vicinity, thereby heating the dye to its vaporization temperature for transfer to the receiver. The absorbing material may be present in a layer beneath the dye and/or it may be admixed with the dye. The laser beam is modulated by electronic signals which are representative of the shape and color of the original image, so that each dye is heated to cause volatilization only in those areas in which its presence is required on the receiver to reconstruct the color of the original object. Further details of this process are found in GB 2,083,726A, the disclosure of which is hereby incorporated by reference.

DESCRIPTION OF RELATED ART

U.S. Pat. No. 4,621,040 relates to a method of forming an image by exposing to a laser, a sheet containing dye microcapsules and a barrier layer. The laser irradiation cross-links the barrier layer and subsequent rupturing of the microcapsules allows the dye to penetrate the uncross-linked barrier layer and transfer to a receiver sheet. There is a problem with this method in that it requires two sheets and a pressure roller in order to transfer the dye.

U.S. Pat. No. 3,322,557 relates to a recording material which is activated by heat or pressure. In this method, reagents are transferred between two sheets to generate a color, or a single sheet can be used if one of the components is encapsulated. In either case, the dye is a precursor which changes color when reacted with an activator. There is a problem with this method in that it either requires two sheets, or encapsulation of materials which can have permeability and raw stock keeping problems.

It is an object of this invention to provide a method of forming an image which requires only a single sheet with no waste. It is another object of the invention to provide a method of forming an image which uses preformed colorants and requires no post processing. It is another object of the invention to provide a method of forming an image which exhibits good raw stock keeping.

SUMMARY OF THE INVENTION

These and other objects are achieved in accordance with this invention which relates to a method of forming an image comprising imagewise-exposing a thermal recording element to heat, the element comprising a support having thereon a thermally-sensitive layer comprising particles containing a colorant, the particles having a particle size between about 1 and about 25 $\mu$m suspended in a matrix, the layer having an optical density no higher than about 0.5, the heating thereby causing the colorant to spread out from the particles into the matrix, thus increasing the optical density in the imagewise-exposed areas.

DESCRIPTION OF THE PREFERRED EMBODIMENTS

The colorant particles useful in the invention are meltable ground pigments, crystallized dyes, amorphous dye clusters, microcapsules containing preformed colorant, beads containing colorants, etc. Beads as used herein are generally understood to be solid particles comprising a colorant dispersed in a binder.

The matrix in which the colorant particles used in the invention are suspended can be any polymer material that resists diffusion of the colorant particles at room temperature. Matrix materials useful in the invention include organic or inorganic polymers. Polymers which can be used in the invention include the following: poly(vinyl chloride), poly(vinylidene chloride), poly(vinyl chloride-co-vinylidene chloride), chlorinated polypropylene, poly(vinyl chloride-co-vinyl acetate), poly(vinyl chloride-co-vinyl acetate-co-maleic anhydride), ethyl cellulose, cellulose acetate propionate, nitrocellulose, poly(acrylic acid) esters, linseed oil-modified alkyd resins, rosin-modified alkyd resins, phenol-modified alkyd resins, phenolic resins, polyesters, polyisocyanate resins, polyurethanes, poly(vinyl acetate), polyamides, chroman resins, gum damar, ketone resins, maleic acid resins, polyvinylacetal, polyvinylbutyral, vinyl polymers such as polystyrene and polyvinyltoluene or copolymers of vinyl polymers with methacrylates or acrylates, low-molecular weight polyethylene, phenol-modified pentaerythritol esters, poly(styrene-co-indene-co-acrylonitrile), poly(styrene-co-indene), poly(styrene-co-acrylonitrile), copolymers with siloxanes, polyalkenes and poly(styrene-co-butadiene), cross-linked gelatin, xanthum gum (available commercially as Keltrol® from Kelco-Merck Co.), poly(vinyl alcohol), polyester ionmers, polyglycols, polyacrylamides, polyalkylidene-etherglycols, polyacrylates, etc. The above matrix materials may be used either alone or in combination.

To increase the cohesion of the matrix layer, polymers which are crosslinked or branched can be used such as poly(styrene-co-indene-co-divinylbenzene), poly(styrene-co-acrylonitrile-co-divinylbenzene), poly(styrene-co-butadiene-co-divinylbenzene), etc.

A dispersion of colorant particles in a matrix will have a low percent of light absorption (i.e., low D-min). The percent of light absorption is approximately equal to the area percent of the imaging layer that is covered by the colorant particles. Thus viewed from the top, if the area that is covered by the colorant particles is 10% of the total surface, then the amount of light absorbed in the spectral region of the colorant will be approximately 10%, i.e., optical density (OD) of 0.046. This OD value will be the contribution to $D_{min}$ due to light absorption by the colorant.

In accordance with the invention, imaging can be induced by heating with a thermal head or by light absorbed by a light-to-heat conversion material, such as a dye or pigment. The absorbed light is converted through nonradiative decay processes of the excited dye into heat. Alternatively, an infrared dye is included in the layer, which upon exposure at the appropriate wavelength will also convert the light energy into heat. By any of these means of exposure, the heat causes a spreading out or dispersion of the colorant from the colorant particle into the matrix. When the colorant is molecularly dispersed, it will cover a larger surface area and will contribute to more light absorption than when it is in the particle form, thus resulting in higher optical density in the imaged areas, i.e., increased optical covering power. Several mechanisms for colorant dispersion may be involved, e.g., melting the colorant, softening of the colorant particle and/or increasing the thermal diffusion of the colorant.

As mentioned above, the method of the invention relies on a spreading out of the colorant in the imaging step. There is usually a certain temperature threshold below which the particles are unaffected. Thus under ambient conditions, where the colorant particles absorb incident light, no change is induced because the amount of heat generated from this process is spread out over a long period of time so that the threshold for colorant diffusion from the particle is not reached.

In the process of the invention, temperatures above this threshold are reached in the imaging step because the heat is generated in a relatively short period of time. In other words, it is the power of the imaging light source (energy output per time unit) and not the energy which determines whether the threshold is reached. As a result, such a thermal element does not require fixing. Generally, in order to have a good thermal stability, this temperature threshold will be at least 30° above room temperature, preferably 50° above room temperature, and most preferably 100° or more above room temperature.

An important ingredient of the thermal element employed in the process of the invention is the composition of the layer in which the colorant particles are dispersed. One should also chose a coating solvent that will not extract the colorant from the particles during the coating and drying steps.

In another embodiment of the invention, the matrix can also contain transparent particles which aid in separating the particles containing the colorant prior to exposure, the transparent particles also aiding the spread of the colorant upon exposure.

In another aspect of the invention, the thermally-sensitive layer has thereon an overcoat layer to act as a protective surface to prevent scratching or smearing. This additional layer may also contain a UV absorber to prevent dye degradation.

Colorants useful in the invention include both pigments and dyes. Pigments which can be used in the invention are desirably meltable or diffusible in the polymer matrix and include the following: organic pigments such as metal phthalocyanines, e.g., copper phthalocyanine, quinacridones, epindolidiones, Rubine F6B (C.I. No. Pigment 184); Cromophthal® Yellow 3G (C.I. No. Pigment Yellow 93); Hostaperm® Yellow 3G (C.I. No. Pigment Yellow 154); Monastral® Violet R (C.I. No. Pigment Violet 19); 2,9-dimethylquinacridone (C.I. No. Pigment Red 122); Indofast® Brilliant Scarlet R6300 (C.I. No. Pigment Red 123); Quindo Magenta RV 6803; Monstral® Blue G (C.I. No. Pigment Blue 15); Monstral® Blue BT 383D (C.I. No. Pigment Blue 15); Monstral® Blue G BT 284D (C.I. No. Pigment Blue 15); Monstral® Green GT 751D (C.I. No. Pigment Green 7) or any of the materials disclosed in U.S. Pat. Nos. 5,171,650, 5,672,458 or 5,516,622, the disclosures of which are hereby incorporated by reference.

Dyes useful in the invention include the following: Anthraquinone dyes, e.g., Sumikaron Violet RS® (product of Sumitomo Chemical Co., Ltd.), Dianix Fast Violet 3R-FS® (product of Mitsubishi Chemical Industries, Ltd.), and Kayalon Polyol Brilliant Blue N-BGM®, and KST Black 146® (products of Nippon Kayaku Co., Ltd.); azo dyes such as Kayalon Polyol Brilliant Blue BM®, Kayalon Polyol Dark Blue 2BM®, and KST Black KR® (products of Nippon Kayaku Co., Ltd.), Sumikaron Diazo Black 5G® (product of Sumitomo Chemical Co., Ltd.), and Miktazol Black 5GH® (product of Mitsui Toatsu Chemicals, Inc.); direct dyes such as Direct Dark Green B® (product of Mitsubishi Chemical Industries, Ltd.) and Direct Brown M® and Direct Fast Black D® (products of Nippon Kayaku Co. Ltd.); acid dyes such as Kayanol Milling Cyanine 5R® (product of Nippon Kayaku Co. Ltd.); basic dyes such as Sumiacryl Blue 6G® (product of Sumitomo Chemical Co., Ltd.), and Aizen Malachite Green® (product of Hodogaya Chemical Co., Ltd.); or any of the dyes disclosed in U.S. Pat. Nos. 4,541,830; 4,698,651; 4,695,287; 4,701,439; 4,757,046; 4,743,582; 4,769,360 and 4,753,922, the disclosures of which are hereby incorporated by reference. The above dyes may be employed singly or in combination. Combinations of pigments and/or dyes can also be used.

The above dyes are thermally-diffusible or meltable. Other desired features for dyes include high extinction coefficient, high thermal and photochemical stability. The use of a mixture of colorants can also provide additional advantages for hue balance and also to alter some of the physical properties (e.g., lowering the melting point).

Useful binders for the beads which may be employed in the invention include the same materials listed above for the matrix, and is preferably a polymer.

The light-to-heat conversion material useful in the invention can be any pigment or dye as described above or an infrared-absorbing dye or pigment such as those described in U.S. Pat. Nos. 5,578,549, 5,234,890 and references therein.

The choice of the light source will depend on the absorption characteristics of the colorant particles or colorant-loaded particles. If an IR laser is to be used for imaging and the colorant does not absorb at that wavelength, an appropriate IR dye or pigment can be included in the system as the light-to-heat conversion material.

The total optical density of the thermal recording element employed in the invention after imaging should be relatively high to provide good viewing contrast in applications, such as medical imaging, and effective absorption in the UV/Visible region when used in masking applications, such as imagesetter films and integral printing plate applications. The total optical density of the thermal recording element after imaging is preferably greater than about 1.0, preferably greater than 1.5.

The invention is especially useful in making high quality reproductions of film radiographs or for the production of digitally-captured diagnostic images. The accurate reproduction of copies of a film-based image or the quality of digitally-generated images is dependent upon the ability of the medium and technique to faithfully reproduce the gray-level gradation between the black and white extremes in the original image.

The invention also is useful in making reprographic masks which are used in publishing and in the generation of printed circuit boards. The masks are placed over a photosensitive material, such as a printing plate, and exposed to a light source. The photosensitive material usually is activated only by certain wavelengths. For example, the photosensitive material can be a polymer which is crosslinked or hardened upon exposure to ultraviolet or blue light, but is not affected by red or green light. For these photosensitive materials, the mask, which is used to block light during exposure, must absorb all wavelengths which activate the photosensitive material in the Dmax regions and absorb little in the Dmin regions. For printing plates, it is therefore important that the mask have high blue and UV Dmax. If it does not do this, the printing plate would not be developable to give regions which take up ink and regions which do not.

By use of this invention, a mask can be obtained which has enhanced stability to light for making multiple printing plates or circuit boards without mask degradation. The process of the invention is well-suited for use with relatively inexpensive and reliable high power diode lasers or $Nd^{++}$ YAG lasers and can be configured in either a flat bed, internal or external drum arrangement. This also includes methods suited for imaging on a laser thermal imagesetter or platesetter equipment.

To obtain a laser-induced image according to the invention, an infrared diode laser is preferably employed since it offers substantial advantages in terms of its small size, low cost, stability, reliability, ruggedness, and ease of modulation.

Lasers which can be used in the invention are available commercially. There can be employed, for example, Laser Model SDL-2420-H2 from Spectra Diode Labs, or Laser Model SLD 304 V/W from Sony Corp.

Any material can be used as the support for the recording element employed in the invention provided it is flexible, dimensionally stable and can withstand the heat of imaging. Such materials include polyesters such as poly(ethylene naphthalate); polysulfones; poly(ethylene terephthalate); polyamides; polycarbonates; cellulose esters such as cellulose acetate; fluorine polymers such as poly(vinylidene fluoride) or poly(tetrafluoroethylene-co-hexafluoropropylene); polyethers such as polyoxymethylene; polyacetals; polyolefins such as polystyrene, polyethylene, polypropylene or methylpentene polymers; flexible metal sheets (which may also function additionally as the electrically conductive layer) such as aluminum, copper, tin, etc.; and polyimides such as polyimide-amides and polyether-imides. The support generally has a thickness of from about 5 to about 200 μm. In a preferred embodiment of the invention, the support is either transparent or reflective.

A thermal printer which uses a laser as described above to form an image on a thermal print medium is described and claimed in U.S. Pat. No. 5,168,288, the disclosure of which is hereby incorporated by reference.

The following examples are provided to illustrate the invention.

EXAMPLES

The following materials were employed in the examples:

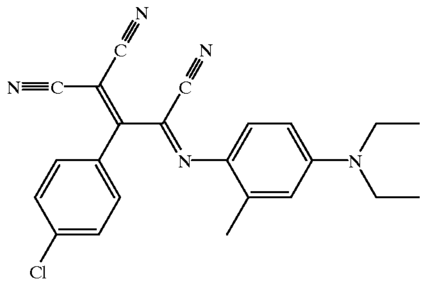

Cyan Dye 1

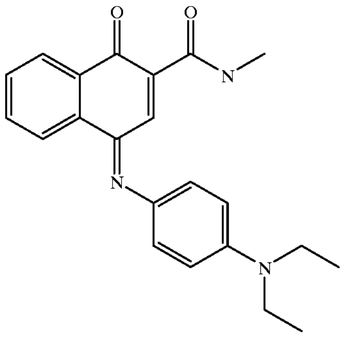

Cyan Dye #2

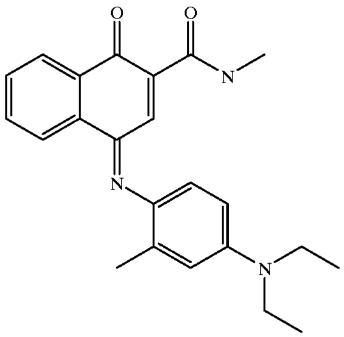

Cyan Dye #3

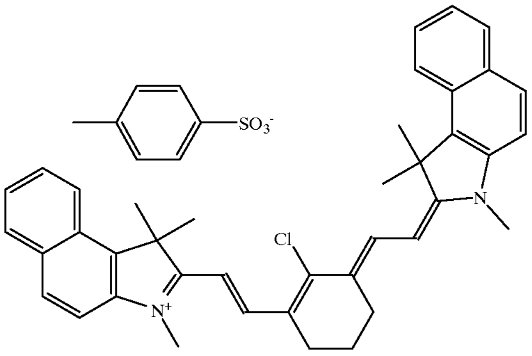

Infrared (IR) Dye #1

Particles were synthesized similarly to the methods disclosed in U.S. Pat. No. 5,334,575.

Particle #1

A solution was made containing:

1 g Cellulose Acetate Propionate, 2 g Cyan dye 1, 0.5 g Cyan Dye 2, 0.5 g Cyan Dye 3, 1.0 g IR dye 1, and 50 g of methylene chloride.

This solution was mixed with another solution containing:

250 ml of pH 4 buffer of potassium hydrogen phthalate (available from VWR Scientific Company), 0.6 g 10% aqueous solution of a copolymer of methylaminoethanol and adipic acid (Eastman Chemical Company), and 1.5 g of Ludox® (an aqueous colloidal dispersion of amorphous silica available from DuPont Specialty Chemicals, Wilmington, Del.).

The combined solutions were mixed for 5 minutes with a Heavy Duty Laboratory Mixer Emulsifier Model L2 Air (Silverson Machines LTD, Waterside, Chelsham, Bucks, England) and then run 3 times through a Microfluidizer® model 110T (Microfluidics Corp. Newton, Mass.). The methylene chloride was removed from the now homogenous appearing solution using vacuum. The solution was spun for 45 minutes at 3000 rev/min to settle the solids. Additional water was added back to give the desired solids content. The resulting particles were approximately 5 $\mu$m in diameter and fairly uniform in size.

Particle #2

This was prepared the same as Particle #1 except that 2.5 g of Cyan dye 1 was employed in the first solution and 3.0 g of Ludox® silica was employed in the second solution. The resulting particles were approximately 2.5 $\mu$m in diameter and fairly uniform in size.

The matrix employed in Elements 1, 2, 4 and 5 was a copolymer of ethyl acrylate and acrylic acid. The matrix in Element 3 was gelatin.

The support was a $TiO_2$ paper coated with a barrier layer of:

poly(vinyl alcohol), 0.70 g/m$^2$,

3–4 $\mu$m polymethylmethacrylate matte particles, 42 g/m$^2$, and

Pfaz® 322 (an aziridine cross-linker from Sybron Chemicals Inc.) 0.05 g/m$^2$; and overcoated with a receiver layer of:

poly(vinyl butyral), 6.19 g/m$^2$,

95:5 copolymer of styrene/divinyl benzene particles 18 $\mu$m in diameter, 0.19 g/m$^2$ and DC 1248 silicone surfactant (Dow Corning Corp.), 0.01 g/m$^2$.

Elements

The following elements were made by coating the support with the materials listed below:

Element 1

Matrix: 1.61 g/m$^2$

Particle 1: 0.27 g/m$^2$

Element 2

Matrix: 0.45 g/m$^2$

Particle 2: 0.05 g/m$^2$

Element 3

Matrix: 0.22 g/m$^2$

Particle 2: 0.04 g/m$^2$

Element 4

Matrix: 0.04 g/m$^2$

Particle 1: 0.22 g/m$^2$

Element 5

Matrix: 1.61 g/m$^2$

Particle 1 0.27 g/m$^2$

An overcoat was applied to Element 5 of 300 mg/ft$^2$ Carboset® XPD-2136 (a BF Goodrich water dispersed polyacrylate copolymer) to act as a protective overcoat.

Each of the elements was printed using a laser diode print head, where each laser beam has a wavelength range of 830–840 nm and a nominal power output of 600 mW at the film plane. The drum, 53 cm in circumference was rotated at varying speeds and the imaging electronics were activated to provide adequate exposure. The translation stage was incrementally advanced across the element by means of a lead screw turned by a microstepping motor, to give a center-to-center line distance of 10.58 mm (945 lines per centimeter or 2400 lines per inch). The measured total power at the focal plane was 600 mW per channel. At a rotation of 1073 rpm, the exposure was about 600 mJ/cm$^2$. The Status A Red optical density of the imaged area and the nonimaged areas were measured using a X-Rite photographic densitometer (Model 310). The following results were obtained:

TABLE 1

| Element | Status Red Dmin | Status Red Dmax 300 mJ/cm$^2$ | Status Red Dmax 600 mJ/cm$^2$ |
|---|---|---|---|
| 1 | 0.29 | 0.80 | |
| 2 | 0.18 | 0.59 | |
| 3 | 0.09 | 0.32 | |
| 4 | 0.16 | 0.46 | |
| 5 | 0.35 | | 1.15 |

The above data show that a significant change in the optical density results from the writing with the laser beam. This change allows a useful image to be generated with a single sheet and no post processing which will be relatively simple and cheap. Element 5 shows that an overcoat may be applied before imaging and still get a useful density change upon imaging, although more power was necessary.

The invention has been described in detail with particular reference to preferred embodiments thereof, but it will be understood that variations and modifications can be effected within the spirit and scope of the invention.

What is claimed is:

1. A method of forming an image comprising imagewise-exposing a thermal recording element to heat, said element comprising a support having thereon a thermally-sensitive layer comprising particles containing a colorant, said particles having a particle size between about 1 and about 25 $\mu$m suspended in a matrix, said layer having an optical density no higher than about 0.5, said heating thereby causing said colorant to spread out from said particles into said matrix, thus increasing the optical density in the imagewise-exposed areas.

2. The method of claim 1 wherein said particles comprise beads containing said colorant dispersed in a binder.

3. The method of claim 2 wherein said binder is a polymer.

4. The method of claim 1 wherein said imagewise-exposure is accomplished using a thermal resistive head.

5. The method of claim 1 wherein said imagewise-exposure is accomplished using a laser.

6. The method of claim 5 wherein said particles contain a light-to-heat conversion material.

7. The method of claim 6 wherein said conversion material is an infrared-absorbing material.

8. The method of claim 1 wherein said matrix is a polymer.

9. The method of claim 1 wherein said layer has an optical density no higher than about 0.3.

10. The method of claim 1 wherein said thermally-sensitive layer has thereon a transparent overcoat layer.

11. The method of claim 1 wherein said support is reflective.

12. The method of claim 1 wherein said support is transparent.

13. The method of claim 1 wherein said matrix also contains transparent particles which aid in separating said particles containing said colorant prior to exposure, said transparent particles also aiding the spread of said colorant upon exposure.

14. The method of claim 1 wherein said colorant is a material which absorbs from about 300 to about 900 nm.

15. The method of claim 1 wherein said colorant is a dye.

16. The method of claim 1 wherein said colorant is a pigment.

* * * * *